Figure 1:
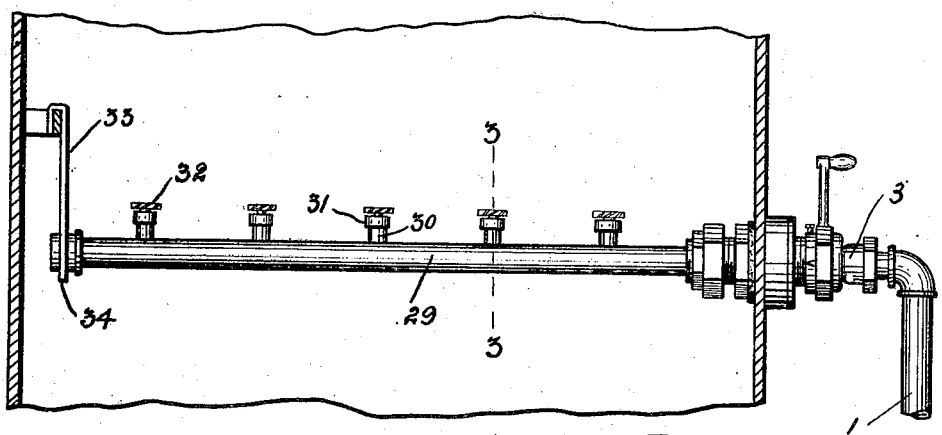

Sept. 9, 1924.  
E. M. DE SHERBININ  
UNION COUPLING FOR REVOLUBLE PIPES  
Filed June 25, 1923  
1,508,168

Patented Sept. 9, 1924.

1,508,168

UNITED STATES PATENT OFFICE.

ERIC MICHAEL DE SHERBININ, OF TORONTO, ONTARIO, CANADA, ASSIGNOR, BY MESNE ASSIGNMENTS, TO PARAGON DISHWASHER SYNDICATE INCORPORATED, A COMPANY OF NEW YORK.

UNION COUPLING FOR REVOLUBLE PIPES.

Application filed June 25, 1923. Serial No. 647,706.

*To all whom it may concern:*

Be it known that I, ERIC MICHAEL DE SHERBININ, a British subject, residing at the city of Toronto, in the county of York and Province of Ontario, Dominion of Canada, have invented certain new and useful Improvements in Union Couplings for Revoluble Pipes; and I hereby declare that the following is a full, clear, and exact description of the same.

My invention relates to the economics of water distribution by conducting it through adjustable channels and directing the discharge from these channels where and as it can most effectively be applied in the full measure of its usefulness.

I propose, therefore, to use a revolubly adjustable pipe having a plurality of outlets through which the water is discharged under pressure and to provide this pipe with an union or coupling by which it can be connected to the supply pipe or main and rotatably adjusted for changing the direction of the streams discharged through the outlets.

The union or coupling comprises a tubular female coupling member and a tubular male coupling member entered therein having a rotating and sliding contact with the female coupling member for the revoluble and axial adjustment of the parts.

In the preferred construction the revolubly adjustable discharge pipe is inserted in one end of the female coupling member, and the male coupling member, which is fitted to the service pipe or main, is inserted in the other end. In this case the female coupling member is rotatable on, and has a sliding contact with, the male coupling member for the axial and revoluble adjustment of the discharge pipe. The bore of the female coupling member is formed with a cavity or recess extending inwardly from that end through which the male coupling member enters and contained within this cavity or recess is a packing and a gland. A packing nut is threaded on the same end of the female coupling member as the gland for pressing the latter against, and expanding, the packing diametrically against the male coupling member and this packing nut is provided with means by which it and the female coupling member can be rotated; this means in the preferred construction consisting of a handle or crank. The female coupling member is journalled in an exteriorly threaded tubular bearing having a flange at one end and a packing nut on the other end with a clamping nut between the packing nut and flange.

In the drawings:—

Figure 2:
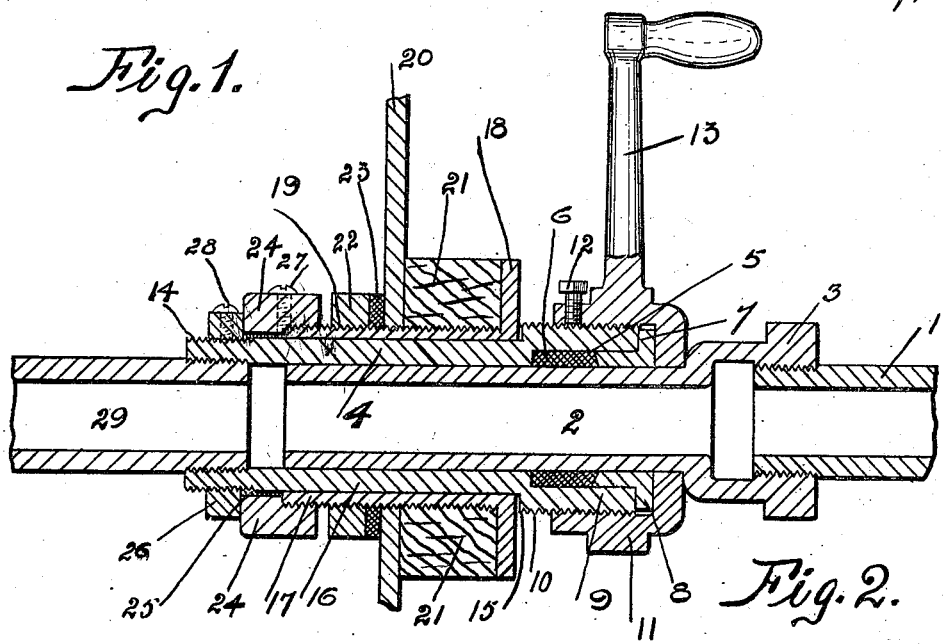
Figure 3:
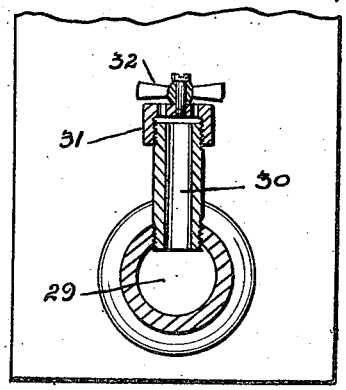

Fig. 1 is a sectional elevation of a revolubly adjustable pipe and coupling constructed in accordance with this invention, Fig. 2 is a longitudinal section of the coupling and the rotatable and stationary pipes, and Fig. 3 is a vertical section on the line 3—3 Fig. 1.

Like characters of reference refer to like parts throughout the specification and drawings.

The subject-matter of the present invention is applicable for dish washing machines in which it is necessary from time to time to change the direction of the water streams discharged through the pipe outlets and it is also applicable in apparatus used for chemical and other operations in which the discharge pipe revolves within the apparatus or the apparatus rotates around the discharge pipe or the discharge pipe and the apparatus rotate in opposite directions.

For the purpose of explaining the invention I will describe it in connection with a stationary service or supply pipe and a revoluble discharge pipe. In this case the supply pipe 1 is fitted with a male coupling member 2 of a elongated tubular shape having at one end an interiorly screw-threaded collar 3 in which the adjacent end of the supply pipe 1 is entered. The female coupling member 4 is also of an elongated tubular construction and is rotatably mounted on and slidingly contacts the outer surface of the male coupling member 2. Formed in that end of the female coupling member 4 adjacent to the collar 3 is a recess or cavity 5 containing packing 6 and a gland 7 having an annular flange 8 exterior to the end. The female coupling member 4, at the end adjacent to the collar 3 is formed with a peripheral enlargement 9 screw-threaded as shown at 10 to receive the packing nut 11. This packing nut when tightened on the enlargement 9 presses the gland 7 against the packing 6 and expands the latter to forcibly contact the male coupling member 2 and prevent leakage between the male and female coupling members to the exterior of the union. Inserted through the packing nut 11 is a set screw 12 by means of which the packing nut is locked in position.

For the revoluble adjustment of the female coupling member the packing nut 11 is shown to be provided with a crank or handle 13 but it may be provided with a wheel or other turning means.

The other end of the female coupling member 4 is reduced and screw-threaded at 14 as shown in Fig. 2, and between the screw-threaded part 14 and the shoulder 15, at the inner end of the enlargement 9, is smooth, to form a journal part 16. The diameter of the journal part 16 is slightly greater than the diameter of the screw-threaded part 14 and slightly less than the diameter of the enlargement 9 and this part 16 of the female coupling member is entered in the bearing 17. This bearing 17 is formed at its inner end with an annular flange 18 seated against the shoulder 15 and the outer surface of the bearing 17 between the flange 18 and its opposite end, is screw-threaded as shown at 19.

The bearing 17 is entered through the vertical wall 20 and contained between the wall 20 and the flange 18 is a spacing washer 21. This spacing washer, however, can be dispensed with and the flange can be moved into contact with the outer surface of the wall 20. On the inner surface of the wall 20 is a clamping nut 22 and between the clamping nut 22 and the inner surface of the wall 20 is a compressible washer 23 which may be rubber or other material which will prevent the fluid finding a leakage between itself and the wall 20 to work out along the screw-threads 19 to the exterior of the apparatus.

Threaded on the inner end of the bearing 17 is a packing nut 24 and between the packing nut 24 and the end of the bearing 17 is packing material 25.

On the screw-threaded end 10 of the female coupling member 4 is a lock nut 26 engaging the adjacent face of the packing nut 24 and locking it in position and entered through the packing nut 24 is a set screw 27 engaging the outer surface of the bearing 17 and entered through the lock nut 26 is a set screw 28 engaging the screw-threaded end 10 of the female coupling member.

The bore of the female coupling member, at its inner end, is screw-threaded to receive the screw-threaded end of the revolubly adjustable pipe 29. This pipe 29 is provided with a plurality of outlets 30 through each of which a plurality of water streams are discharged under pressure. These outlets are fitted with nozzles 31 having spinners 32 for scattering the water streams radially, and tangentially, to the discharge of the water streams through the outlets.

The position of the nozzles is changed by the revoluble adjustment of the pipe 29, and this adjustment being effected by rotating the female coupling by means of the crank 13.

In apparatus for chemical and other operations in which fluids are to be mixed, a pulley or wheel can be substituted for the crank and power can be applied for the continuous rotation of the female coupling member and discharge pipe.

Where the pipe is of a considerable length, its inner end is journalled in a bearing. For this purpose a hanger or bracket 33 may be suspended within the apparatus and provided with a bearing 34 in which the adjacent end of the pipe is mounted.

Having thus fully described my invention, what I claim as new and desire to secure by Letters Patent is:—

1. In an union coupling, the combination with a tubular male coupling member, a tubular female coupling member rotatable on, and having a sliding contact with, the male coupling member, a gland inserted in one end of the female coupling member and a packing nut threaded on the same end of the female coupling member and pressing against the gland, means for rotating one of the coupling members, an exteriorly threaded tubular bearing for the female coupling member, a packing nut at the inner end of the bearing having a flange at one end, a packing nut on the inner end of the bearing and a clamping nut on the bearing opposed to the flange.

2. In an union coupling, the combination with a tubular male coupling member, a tubular female coupling member rotatable on, and having a sliding contact with, the male coupling member, a gland inserted in one end of the female coupling member and a packing nut threaded on the same end of the female coupling member and pressing against the gland, means for rotating one of the coupling members, an exteriorly threaded tubular bearing for the female coupling member, a packing nut at the inner end of the bearing having a flange at one end, a packing nut on the inner end of the bearing, a clamping nut on the bearing opposed to the flange, and a spacing washer between the clamping nut and flange.

3. In an union coupling, the combination with a tubular male coupling member, a tubular female coupling member rotatable on, and having a sliding contact with, the male coupling member, a gland inserted in one end of the female coupling member and a packing nut threaded on the same end of the female coupling member and pressing against the gland, means for rotating one of the coupling members, an exteriorly threaded tubular bearing for the female coupling member, a packing nut at the inner end of the bearing having a flange at one end, a packing nut on the inner end of the bearing, a clamping nut on the bearing opposed to the flange, a spacing washer between the clamping nut and flange, and a lock nut on the inner end of the female coupling member for the last mentioned packing nut.

Dated at the said city of Toronto, this 30th day of May, A. D. 1923.

ERIC MICHAEL DE SHERBININ.

Witnesses:
    STANLEY RICHES,
    ROBERT MCCLINTOCK.